(12) United States Patent
Baenninger et al.

(10) Patent No.: US 10,160,594 B2
(45) Date of Patent: Dec. 25, 2018

(54) CAPSULE FOR THE PREPARATION OF A BEVERAGE FROM LIQUID SUPPLIED BY A DEVICE

(71) Applicant: Nestec S.A., Vevey (CH)

(72) Inventors: Philippe Baenninger, Epalinges (CH); Youcef Ait Bouziad, Echandens (CH); Heinz Wyss, Oberdiessbach (CH); Jean-Marc Flick, Pomy (CH)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 15/742,224

(22) PCT Filed: Aug. 22, 2016

(86) PCT No.: PCT/EP2016/069786
§ 371 (c)(1),
(2) Date: Jan. 5, 2018

(87) PCT Pub. No.: WO2017/032734
PCT Pub. Date: Mar. 2, 2017

(65) Prior Publication Data
US 2018/0201435 A1   Jul. 19, 2018

(30) Foreign Application Priority Data

Aug. 25, 2015 (EP) .................................... 15182342

(51) Int. Cl.
*B65D 85/804* (2006.01)
*A23L 33/00* (2016.01)

(52) U.S. Cl.
CPC .......... *B65D 85/8043* (2013.01); *A23L 33/40* (2016.08); *A23V 2002/00* (2013.01)

(58) Field of Classification Search
CPC .................................................. B65D 85/8043
USPC ........................................................... 99/295
See application file for complete search history.

(56) References Cited

U.S. PATENT DOCUMENTS

| 2004/0115317 A1* | 6/2004 | Doglioni | A47J 31/0673 |
| | | | 426/123 |
| 2004/0182251 A1 | 9/2004 | Halliday et al. | |
| 2009/0223375 A1* | 9/2009 | Verbeek | A47J 31/405 |
| | | | 99/287 |

(Continued)

FOREIGN PATENT DOCUMENTS

| EP | 2236437 A1 | 10/2010 |
| ES | 2525250 A1 | 12/2014 |
| JP | 2000348249 A | 12/2000 |

(Continued)

OTHER PUBLICATIONS

International Search Report, dated Oct. 20, 2016, in PCT/EP2016/069786, filed Aug. 22, 2016.

(Continued)

*Primary Examiner* — Viren A Thakur
*Assistant Examiner* — Chaim A Smith
(74) *Attorney, Agent, or Firm* — Dunlap Codding, P.C.

(57) ABSTRACT

A capsule for preparing a beverage and connectable to a machine for supplying sanitized liquid to the capsule is disclosed. The capsule includes a product compartment and a spout that includes a housing and a fluid connector adapted to be fluidly connected to the machine and to supply liquid inside the product compartment.

19 Claims, 15 Drawing Sheets

(56) References Cited

U.S. PATENT DOCUMENTS

2013/0105340 A1* 5/2013 Hother ................ A47J 31/3676
206/222

FOREIGN PATENT DOCUMENTS

| WO | 2002091903 | A2 | 11/2002 |
| WO | 2004065225 | A2 | 8/2004 |
| WO | 2009027131 | A1 | 3/2009 |
| WO | 2010112353 | A1 | 10/2010 |
| WO | 2010128051 | A1 | 11/2010 |
| WO | 2012066313 | A2 | 5/2012 |
| WO | 2017032731 | A1 | 3/2017 |

OTHER PUBLICATIONS

Written Opinion of the International Searching Authority, dated Oct. 20, 2016, in PCT/EP2016/069786, filed Aug. 22, 2016.
International Search Report, dated Nov. 10, 2016, in PCT/EP2016/069782, filed Aug. 22, 2016.
Written Opinion of the International Searching Authority, dated Nov. 10, 2016, in PCT/EP2016/069782, filed Aug. 22, 2016.

* cited by examiner

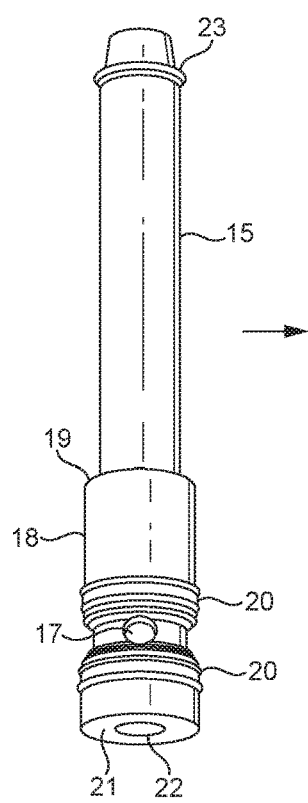
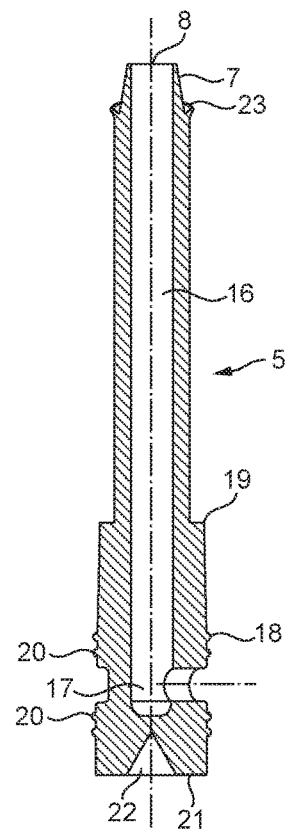
FIG. 3     FIG. 4
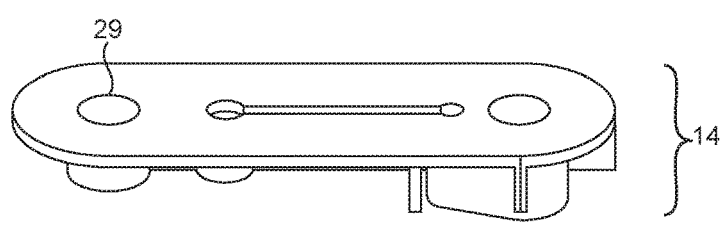
FIG. 5
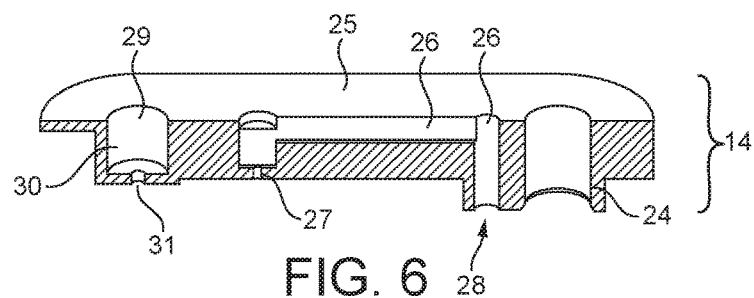
FIG. 6

CAPSULE FOR THE PREPARATION OF A BEVERAGE FROM LIQUID SUPPLIED BY A DEVICE

CROSS-REFERENCE TO RELATED APPLICATIONS/INCORPORATION BY REFERENCE STATEMENT

This application is a US national stage application filed under 35 USC § 371 of International Application No. PCT/EP2016/069786, filed Aug. 22, 2016; which claims priority to EP App No. 15182342.4, filed Aug. 25, 2015. The entire contents of the above-referenced patent applications are hereby expressly incorporated herein by reference.

TECHNICAL FIELD

The present disclosure relates to capsule for preparing a beverage such as a nutritional liquid composition in a safe and hygienic manner. In particular, the capsule contains nutritional ingredients, such as an infant formula, milk- or soya-based ingredients and connects to a device to be supplied with a liquid; the liquid being associated with the nutritional ingredients in the capsule for preparing the beverage, such as a ready-to-drink infant formula composition.

BACKGROUND

Nowadays, machines or systems for preparing nutritional beverages by mixing nutritional ingredients with liquid, usually water, are frequently used for in-home and out-of-home applications and should develop further for feeding patients in hospitals or clinics.

When preparing certain beverages for more fragile persons such as infants, toddlers, patients or seniors, it is important to ensure that the liquid to mix with the product ingredients and supplied by the machine is safe on a microbiological point of view, each time the machine is used. Liquid can contain undesired contaminants such as microorganisms or viruses for example. These undesired contaminants should be removed or neutralized from the liquid before the liquid is mixed with the nutritional ingredients contained in the package.

A particular problem can be called the "last mile". The "last mile" is actually a part of the fluidic line between the sanitizing area in the machine and the mixing or reconstitution point in the package that may not be properly decontaminated or sanitized. Such a portion can be a more or less small portion of surface, a conduit, a needle and the like.

U.S. Pat. No. 6,118,933 relates to an apparatus or method for preparing infant formula from powder with dispensing and filtering means. The apparatus comprises a reservoir for holding a supply of water, a heating element for heating well in advance water at a temperature suitable for being safely fed to a baby, a baby bottle positioned for receiving water dispensed from the reservoir through a spigot and a supply of powdered formula for immediately mixing with water dispensed from the reservoir through the spigot. The apparatus further comprises means for disinfecting including a ultra-violet (UV) lamp disposed within the reservoir or means for filtering the bacteria from the water within the flow path between the pump and the spigot. Such system is not very convenient as it requires the user to dose the right amount of powder in the baby bottle but more importantly, it is not so safe because the spigot itself may be contaminated and vehicle contaminants in the water passing therethrough.

EP2046398 relates to a dispenser for preparing a nutritional composition comprising a reservoir, water heating means and water discharge means wherein a bacterial filter is provided between the water heating means and the water discharge means such that heated water passes the filter prior to discharge from the dispenser. A steam generator is further provided such that the interior of the water discharge means and/or filter surface may be cleaned by the passage of steam during each cycle.

EP2134222 relates to an apparatus for producing a drink, for example milk, configured to prepare the drink concentrate by mixing the amount of formula (P) necessary for the total amount of drink in a certain amount of hot liquid having a temperature in the range of 60-80° C., and to add the right amount of liquid of a certain low temperature to the concentrate in order to reach the end volume of the drink at safe drinking temperature. The apparatus further comprises a radiation system comprising an UV-lamp and a UV-transparent tube such that during operation the tube contains the lamp flowing around, or the liquid flows through a tube with the UV-radiation coming from the outside.

WO 2009/027131 relates to a dispensing device for preparing and dispensing nutritional composition from a capsule containing nutritional ingredients comprising a water circuit, a water heater, an injection head comprising intruding part for injecting water in the capsule comprising the ingredients; a capsule holder for holding the capsule during injection of water in the capsule, wherein it comprises cleaning and/or sanitizing means arranged to inject a cleaning agent in at least a portion of the water circuit and through the injection intruding part, and collecting means which can be associated in engagement with the injection head for enabling the collecting means to collect and discard the cleaning agent after it has passed through the injection intruding part.

WO2009/092629 relates to a capsule for nutritional beverage with an integrated antimicrobial filter.

EP2236437 relates to a capsule for a nutritional beverage with an antimicrobial filter and furthermore a flow collection member placed downstream of the filter to collect the filtered liquid and for producing a jet of liquid at high velocity in the compartment containing the ingredients.

WO2010/128028, WO2010/128031, WO2010/128051 relate to a capsule with an integrated antimicrobial filter unit further comprising an air inlet and conduit for enabling residual liquid to be removed from the capsule to ensure emptying of the capsule and a full dispensed feed.

The problem of the capsules with an integrated antimicrobial filter lies in the complexity of the capsule and the filter material cost and production cost which are very high.

Therefore, there is a need for a simpler, lower cost capsule connectable to a dedicated beverage preparation device which is safe for preparing a beverage, in particular, by solving the "last mile" problem and having only cleansed/sanitized liquid supplied to the capsule each time a beverage is prepared.

BRIEF DESCRIPTION OF THE FIGURES

FIG. 3 is perspective view of the fluid connector of the capsule of FIG. 1.

FIG. 4 is a side view of the fluid connector of FIG. 3.

FIG. 5 is a perspective view of the guiding insert of the capsule of FIG. 1.

FIG. 6 is a perspective cross-sectional view of the guiding insert of the capsule of FIG. 1.

DETAILED DESCRIPTION

Figure 1:
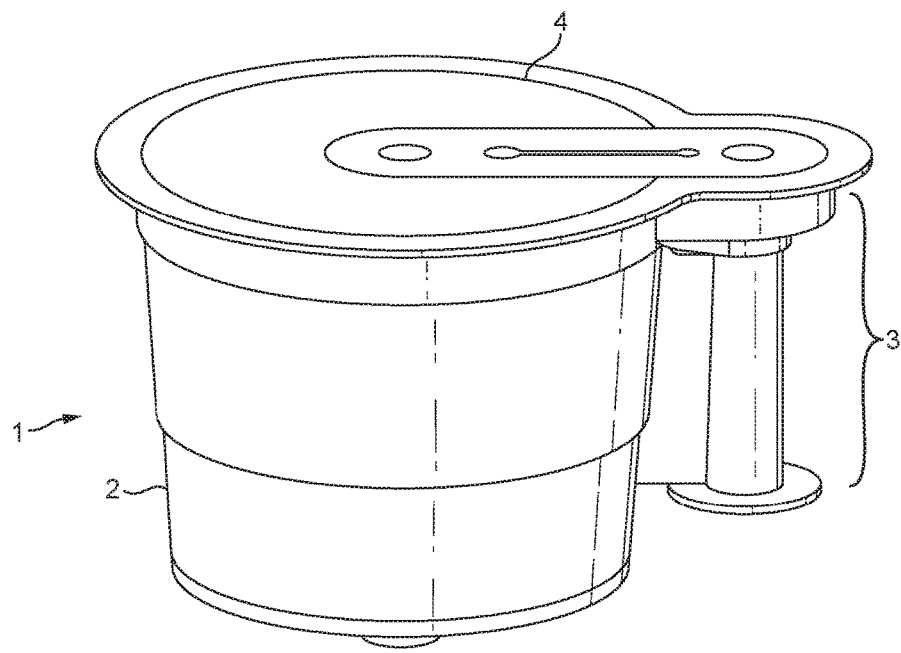
FIG. 1 is perspective view of the capsule of the present disclosure according to a first embodiment (spout adjacent to the body of the capsule).

The present disclosure provides a solution to these needs and alleviates the mentioned problem.

For this the present disclosure relates to a capsule according to claim 1. The dependent claims further define the capsule of the present disclosure.

The present disclosure relates to a capsule for preparing a beverage connectable to a machine for supplying sanitized liquid to the capsule, wherein the capsule comprises:

a product compartment containing nutritional ingredients to produce the beverage when associated with liquid, a spout comprising a housing and a fluid connector adapted to be fluidly connected to a connection part of a liquid supply and treatment unit of the machine and to supply liquid inside the product compartment;

wherein the fluid connector is arranged in the housing to be displaceable between a storage position in which the connector is enclosed in the housing and an extended position in which at least a frontal portion of the connector including its tip with a liquid inlet extends beyond the housing, such as (but not limited to) outside of the capsule. In particular, the frontal portion of the connector extends beyond the housing for enabling at least the tip of the connector to be inserted in the liquid supply and treatment unit and to be exposed to an optical sanitizing field inside the unit.

Therefore, the capsule of the present disclosure is designed to cooperate directly in a movable, and in certain non-limiting embodiments deployable, manner with the liquid supply and treatment unit of the machine so that only cleansed liquid enters the capsule and the risk of contamination is prevented.

In certain non-limiting embodiments, the fluid connector is sealingly arranged inside the housing in aseptically stored condition. By "aseptically stored condition" it is meant that the fluid connector and the interior of the housing are essentially free of microorganisms. Such condition is obtained by appropriate aseptic operation(s), including treatment, assembling and filling, such as by use of oxygen peroxide, UV radiation, alcohol, heat or steam, aseptic gas flowing/flushing, and combinations thereof.

In certain non-limiting embodiments, the fluid connector is arranged within the housing to be slidably moveable between the storage position and the extended position. In other words, the fluid connector is mounted in a telescopic manner relative to the housing. One advantage is that the fluid connector can be hygienically protected from contaminants in the package before the first use and be extended for connection, when required, with the device. This telescopic configuration also provides the advantage that the package size can remain compact.

In certain non-limiting embodiments, the housing is configured at least partially as a guiding tube for housing the fluid connector, with a front end opening for enabling the frontal portion of the connector to extend beyond the housing in the extended position and a rear end opening forming a passage to a pusher of the machine for enabling the pusher to push a distal end of the connector (opposed to said tip) so that the connector can be moved into the extended position. Additionally, the front end opening and/or rear end opening is sealed by a breakable, tearable or removable sealing part, such as (but not limited to) a membrane. The advantage is that the fluid connector remains well protected in the housing but is easily and simply actuatable for connection to the machine.

In certain non-limiting embodiments, the connector is arranged in the housing such that when it is moved to its extended position, a flow path is created between the connector and the product compartment, via the housing, that corresponds to a liquid dispensing position.

In particular, the fluid connector may comprise a portion of needle comprising a longitudinal internal liquid conduit extending axially along the portion of needle from a liquid inlet at its tip to at least one liquid outlet. In certain non-limiting embodiments, the liquid outlet extends transversally to the axial conduit. The liquid outlet may be positioned, for example, at a base portion of the fluid connector. Annular seal members may be provided between the fluid connector and the housing on each side of the liquid outlet so that no liquid can leak out of the housing.

The frontal portion of the fluid connector, for example (but not limited to) corresponding to the portion of needle, including its tip, is extendable beyond the housing in extended position of a length of at least 5 mm, such as (but not limited to) between 8 and 20 mm. In certain non-limiting embodiments, the base portion comprises an enlarged diameter forming an abutment with the housing in the extended position of the connector. In certain non-limiting embodiments, the liquid outlet is also positioned to match with a liquid inlet and/or conduit in the housing communicating with the product compartment when the connector is moved towards or into the extended position.

The advantage of this configuration is that the fluid connector is positionable in a well-defined position for liquid to be properly guided from the tip of the fluid connector where liquid first enters the capsule to the product compartment.

In one possible embodiment, the product compartment and housing form together an integral part of a moulded body with a large opening. In certain non-limiting embodiments, the body comprises a seat for receiving a guiding insert for fluidly connecting the fluid connector to the compartment. The guiding insert comprises a liquid inlet arranged for matching or communicating with the liquid outlet of the connector in a liquid dispensing position of the connector in the housing, a liquid conduit and at least one liquid outlet communicating with the product compartment. In certain non-limiting embodiments, the liquid outlet is of reduced size compared to the liquid conduit so as to form a high-energy nozzle that facilitates mixing of the nutritional ingredient(s). The diameter of the outlet may be 0.2 to 1 mm. Of course, several liquid outlets may also be provided to form a dispersion or shower of liquid in the compartment. The configuration of the liquid outlet is dependent on the type of nutritional ingredient and the mixing mode (e.g., dissolution, infusion, extraction, dilution, emulsion, etc.).

The large opening may be advantageously closed by a lid attached onto a flange bordering the product compartment and the seat. The lid may be a breakable or perforable flexible membrane or foil. The fluid connector is also arranged adjacent the lid to break or perforate the lid when moved to the extended position.

The guiding insert may further comprise an air inlet, an air conduit and an air outlet. The air inlet, air conduit and air outlet can be separated from the liquid inlet, liquid conduit and liquid outlet. In certain non-limiting embodiments, the air inlet is also closed by the lid. Of course, the air inlet, air conduit and air outlet could be arranged differently such as be part of the housing. However, considering the arrangement of the capsule with the housing being part of the body, the arrangement with a separate air system is simpler and easier to activate.

In a second particular (but non-limiting) embodiment, the housing for the fluid connector forms an integral part of or merges with a lid closed onto the product compartment. In certain non-limiting embodiments, a fluid conduit is present between the housing and the lid. The fluid conduit is arranged for fluid to be transferred from the fluid connector to the product compartment. The fluid conduit can comprise at least one liquid outlet. In certain non-limiting embodiments, the liquid outlet is of reduced size compared to the liquid conduit so as to form a high-energy nozzle that facilitates mixing of the nutritional ingredient(s). The diameter of the outlet may be 0.2 to 1 mm. Of course, several liquid outlets may also be provided to form a dispersion or shower of liquid in the compartment.

Such alternative embodiment provides the advantage of a more compact capsule with fewer pieces. Since the fluid conduit is directly provided between the lid and the housing placed adjacent one another, a third piece like a guiding insert is not necessary.

In such mode, the fluid connector may further comprise a longitudinal internal air conduit extending axially along the fluid injector from an air inlet at the distal end of the fluid injector to an air outlet positioned or extending transversally to the axial air conduit. A separation wall may be present between the air and liquid conduits. Sealing means may further be provided between the fluid connector and the housing to allow the fluid connector to be positioned in the liquid dispensing position where the liquid outlet communicates with the fluid conduit of the housing and an air dispensing position where the air outlet of the fluid connector communicates with the fluid conduit of the housing. In certain non-limiting embodiments, the liquid outlet and air outlets of the fluid connector are arranged axially and angularly distant one another and the fluid connector is rotationally and slidably arranged in the housing between the liquid dispensing position and the air dispensing position. In certain non-limiting embodiments, the liquid outlet and air outlets of the fluid connector are arranged axially, and possibly angularly, distant one another. The fluid connector is slidably arranged in the housing between the liquid dispensing position and the air dispensing position. Therefore, the selection of one of the liquid path or air path is dependent on the position of the fluid connector relative to the housing or lid.

In any possible modes, the fluid connector comprises a filtering means to filter liquid.

The advantages of this second embodiment come from the integration of the pressurized air flow path to the fluid connector, housing and lid. The fluid conduit in the lid can be used both for liquid and air dispensing within the product compartment. The capsule is therefore simplified with fewer pieces. Furthermore, the machine is simplified as well because only one actuation member (e.g. pusher) is necessary to move the connector for the changeover in liquid dispensing mode or air dispensing mode.

The appended drawings are given as a matter of non-exhaustive illustration of the particular (but non-limiting) embodiments.

The capsule 1 of the present disclosure is designed for preparing a beverage when connected to a machine supplying liquid to the capsule. The capsule can be a single-use beverage capsule for example. The capsule generally comprises a product compartment 2 which contains nutritional ingredients to produce the beverage when associated with the liquid. The capsule further comprises a spout 3.

The compartment 2 and spout 3 may be closed by a lid 4. The lid may be sealed (welded) on the flange of the compartment and spout. The spout comprises a fluid connector 5 arranged to be displaceable in a housing 6 of the spout. The fluid connector is elongated and guided in a substantially tubular housing 6. In particular, the fluid connector can be displaced between a storage position in which the fluid connector is fully encased or enclosed in the housing and a treatment or extended (or deployed) position in which at least part of the fluid connector extends beyond the housing for enabling at least part of the tip 7 of the connector to be inserted in a liquid supply and treatment unit which will be detailed later. The fluid connector is arranged in the housing to be slidably moveable between the storage position and the treatment position. When the fluid connector is displaced into the position of insertion, the lid 4 is opened such as by breaking or puncturing. It would be possible that part of the lid can be removed, e.g. peeled off, to allow the extension of the fluid connector beyond the housing for connection to the machine.

The capsule is configured such that the fluid connector forms the entry point for liquid. In particular, the fluid connector comprises a liquid inlet 8 at the tip as shown in FIG. 4.

Figure 2:
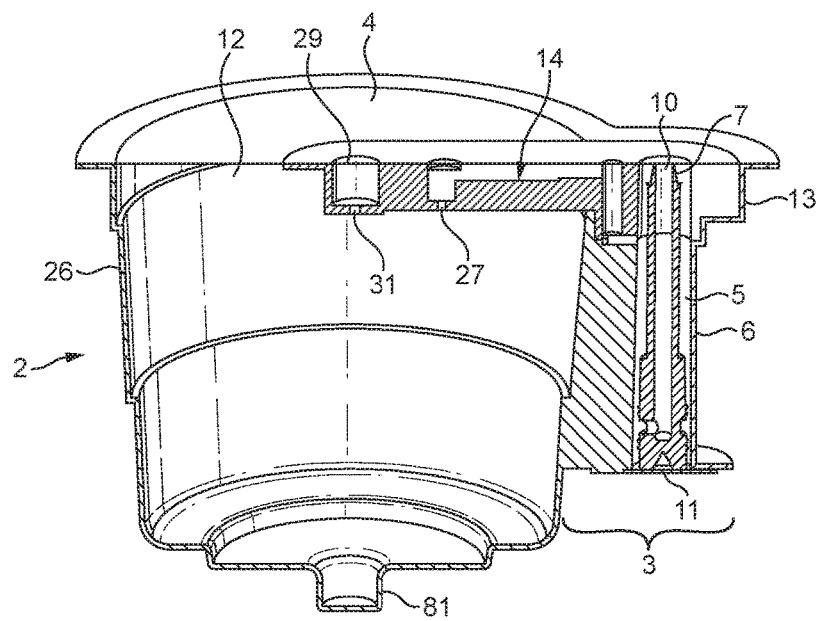
FIG. 2 perspective cross sectional view of the capsule of the present disclosure according to FIG. 1.
Figure 11:
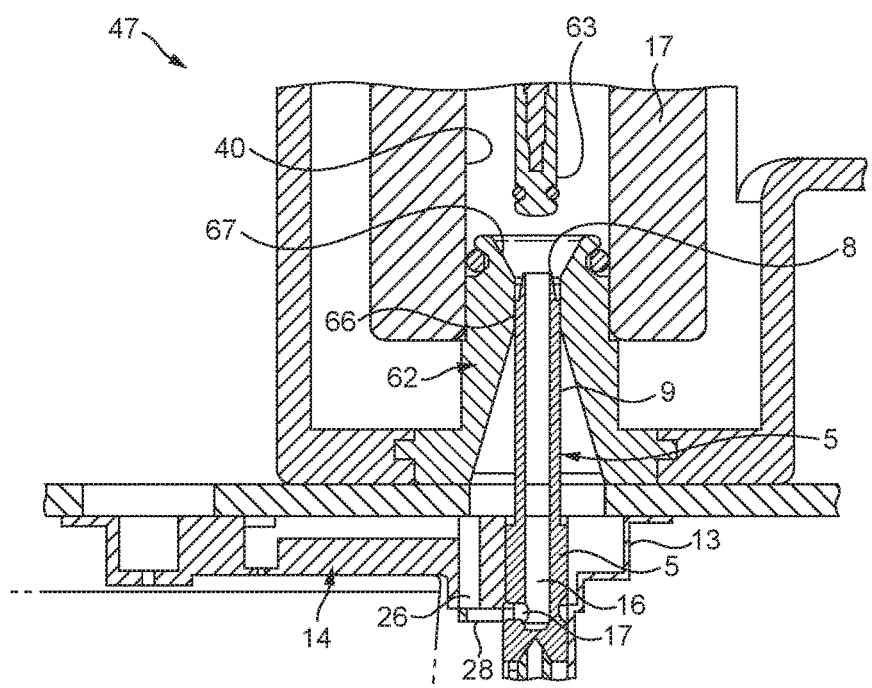
FIG. 11 is an enlargement view of FIG. 10.

The capsule represented in FIGS. 1 and 2 corresponds to the storage position before use. The longest position of extension possible of the fluid connector is illustrated in FIG. 11 and corresponds to the position of insertion of the fluid connector through the machine for irradiation treatment by UV as will be explained later on in detail. As shown in FIG. 11, in certain non-limiting embodiments, a frontal portion 9 is extendable beyond the housing a sufficient distance to properly insert in the machine for connection and proper UV treatment. Its length of extension may be of at least 5 mm, such as (but not limited to) comprised between 8 and 20 mm.

The housing 6 is formed at least partially as a guiding tube for housing the connector, with a front end opening 10 for enabling the frontal portion of the connector to extend beyond the housing in the treatment position and a rear end opening 11 for forming a passage to a pusher of the machine and for enabling the pusher to push a distal end 21 of the connector (opposed to said tip 7) so that the connector can be moved into the treatment position.

Both front and rear end openings 10, 11 may be sealingly closed by breakable, tearable or removable sealing parts. These parts can be membranes such as thin aluminium discs welded on the edges of the openings. In certain non-limiting embodiments, the fluid connector is stored inside the housing in aseptic condition before breakage of the sealing parts.

In the illustrated embodiment, the product compartment and housing form together an integral part of a moulded body with a large opening or mouth 12. The body comprises a seat 13 that forms the upper part of the spout 3 and housing 6 for receiving a guiding insert 14. The guiding insert 14 has the function of fluidly connecting the fluid connector 5 to the compartment containing the ingredients to allow liquid entering the liquid inlet 8 to be fed in the compartment 2.

In regards to FIGS. 3 and 4, the fluid connector 5 comprises a portion of needle 15 with a longitudinal liquid conduit 16 extending axially along the portion of needle. The conduit extends from the liquid inlet 8 at the tip to at least one liquid outlet 17 which is, in certain non-limiting embodiments, positioned or extends transversally to the axial conduit. The fluid connector may further comprise a base portion 18 of larger diameter than the needle portion 15 with, in certain non-limiting embodiments, an abutment or step 19 which may allow limiting the position of extension of the fluid connector relative to the housing 6. Seal members 20 may be provided on each sides of the liquid outlet to ensure that liquid cannot leak out of the fluid injector. At the distal end 21 of the fluid injector may be placed a centring recess 22 for guiding insertion of the pusher of the machine in the injector.

At the tip 7 of the fluid injector, an annular seal member 23 may also be provided to ensure a liquid tight engagement with the liquid supply and treatment unit of the machine during insertion as will be described later.

Figure 12:
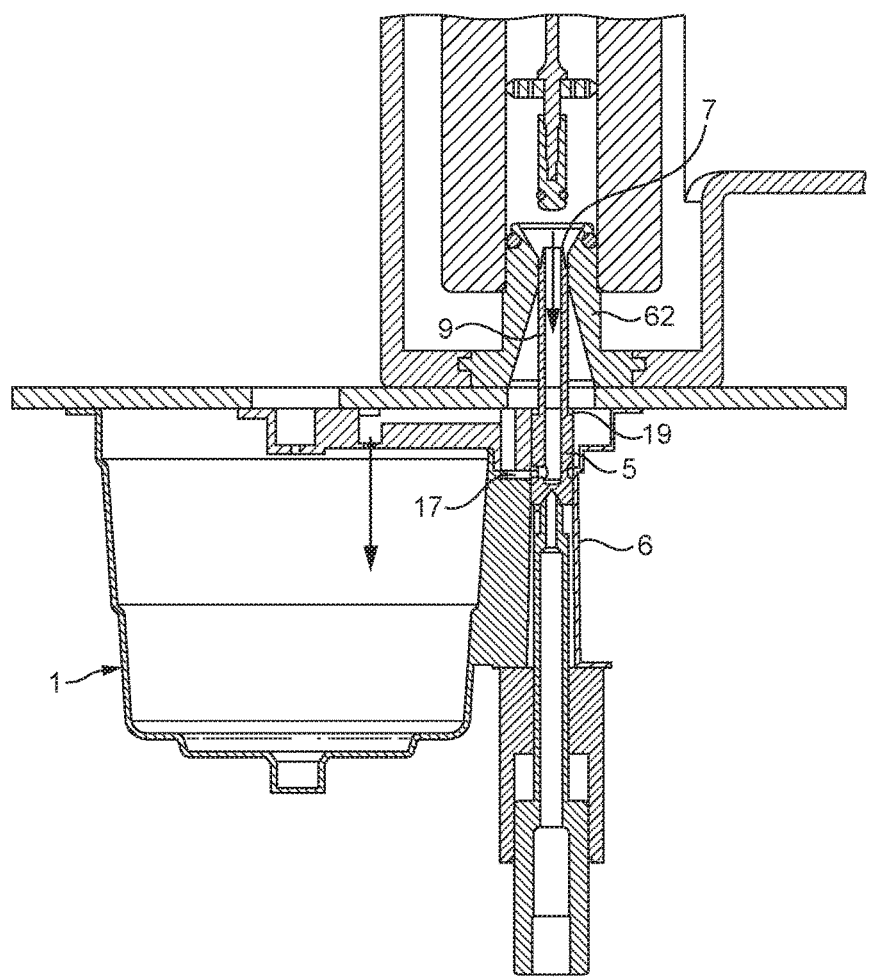
FIG. 12 represents part of the apparatus in the liquid dispensing mode.

In regards to FIGS. 5 and 6, the guiding insert 14 is illustrated in detail. The guiding insert comprises a main guiding passage 24 for guiding the fluid injector in translational displacement between its storage and extended position. It further comprises a beak 25 traverses by a liquid conduit 26 leading to a liquid outlet 27. The guiding insert may complementary fit in the seat of the housing to demarcate further a liquid inlet 28 (FIGS. 6 and 11). The liquid inlet is intended to match with the liquid outlet 17 of the fluid injector when the latter is positioned in the extended position corresponding to the liquid dispensing position (FIG. 12). The insert can be of various lengths but generally enables to deport the liquid delivery in a more central location of the compartment as shown in FIG. 2. In certain non-limiting embodiments, the liquid outlet 27 is of reduced diameter compared to the conduit 26 so as to create a liquid jet of high velocity that promotes the dissolution or dispersion of the nutritional ingredient with liquid. Furthermore, the guiding insert may comprise an air inlet 29, an air conduit 30 and air outlet 31. Pressurized air may be useful to deliver in the compartment to empty the capsule from liquid after liquid dispensing. The air inlet 29 can be closed by the coverage of the lid 4 of the capsule. The lid can be partially welded to the upper surface of the insert to hermetically and separately close the air inlet and liquid conduit 26. To inject air in the capsule, the lid can be broken and an air injector (e.g air injection needle) of the machine is introduced in the large conduit 29

Figure 7:
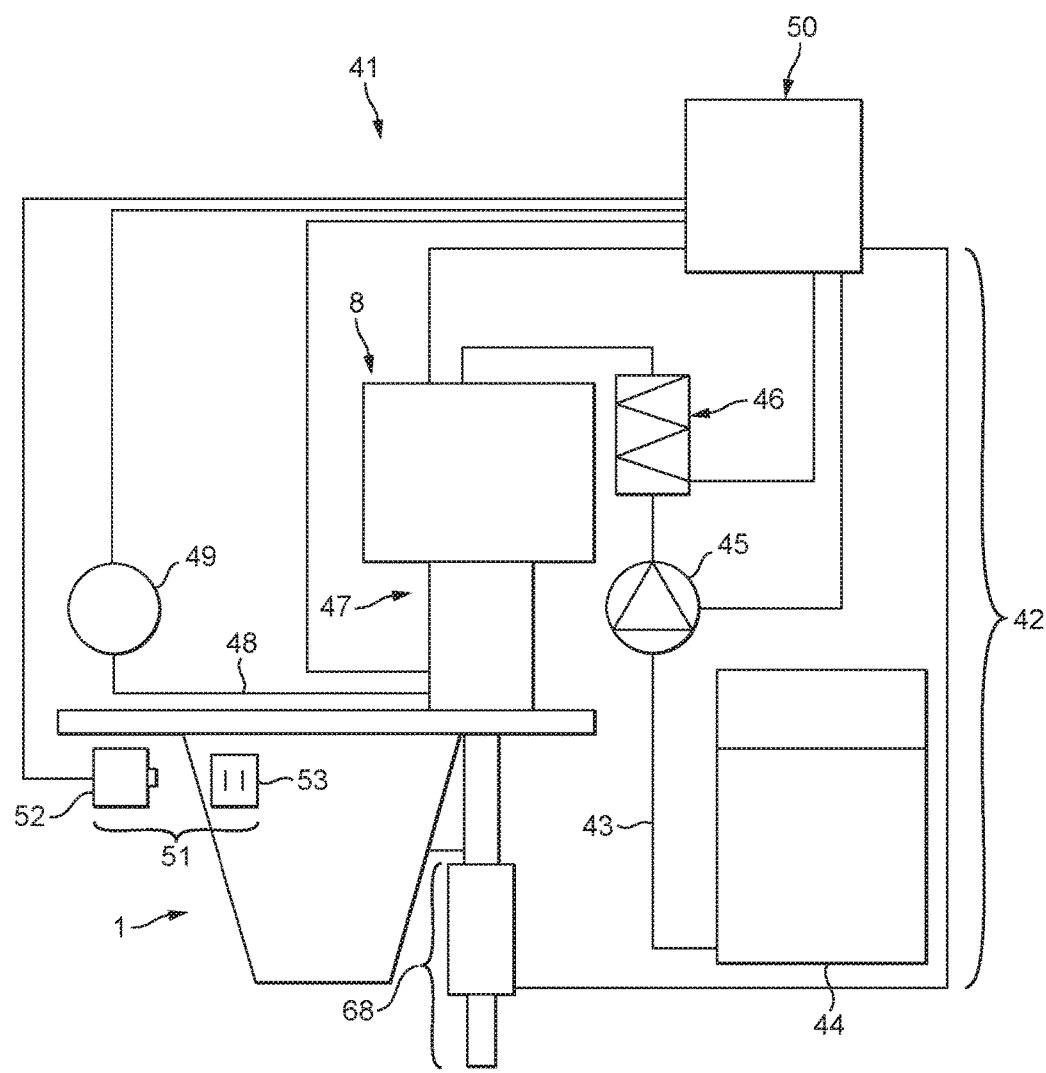
FIG. 7 represents a schematic view of a mode of the apparatus of the present disclosure.

Now a general presentation of the apparatus is visible on FIG. 7. The apparatus 41 is designed to prepare a beverage, such as infant formula liquid, by delivering cleansed or sanitized liquid within the capsule 1 containing nutritional ingredients such as infant formula or milk powder. The apparatus generally comprises a machine 42. The capsule and machine 1, 42 are connectable together to allow the machine to controllably supply liquid in the capsule, at controlled temperature and volume; such liquid mixing with the nutritional ingredients to prepare the beverage. Liquid is generally water but could be another liquid solvent. The beverage is then dispensed from the capsule 1 into a recipient such as a baby bottle (not represented). Dispensing of the beverage may be produced by opening the capsule such as under the effect of pressure inside the package or through a filter in the bottom of the capsule.

The machine generally comprises a liquid circuit 43 comprising a liquid reservoir 44 connected to a pump 45 and a liquid heater 46. The liquid circuit supplies liquid at controlled temperature to a liquid supply and treatment unit 47. The machine may further comprise a (optional) pressurized air circuit 48 with an air pump 49 or any other controllable air supply such as a compressed air reservoir (e.g., air cartridge) and a controllable valve. A control unit 50 is also provided to control all these active elements of the machine as will be described later. The apparatus may also optionally comprise a capsule recognition system 51 having a code recognition device 52 as part of the machine and a code 53 arranged on the capsule. The system can provide data input to the control unit to adjust output to operate specifically certain elements of the machine. The code can be a barcode for example and the code recognition device can be an infrared reader or similar.

Figure 8:
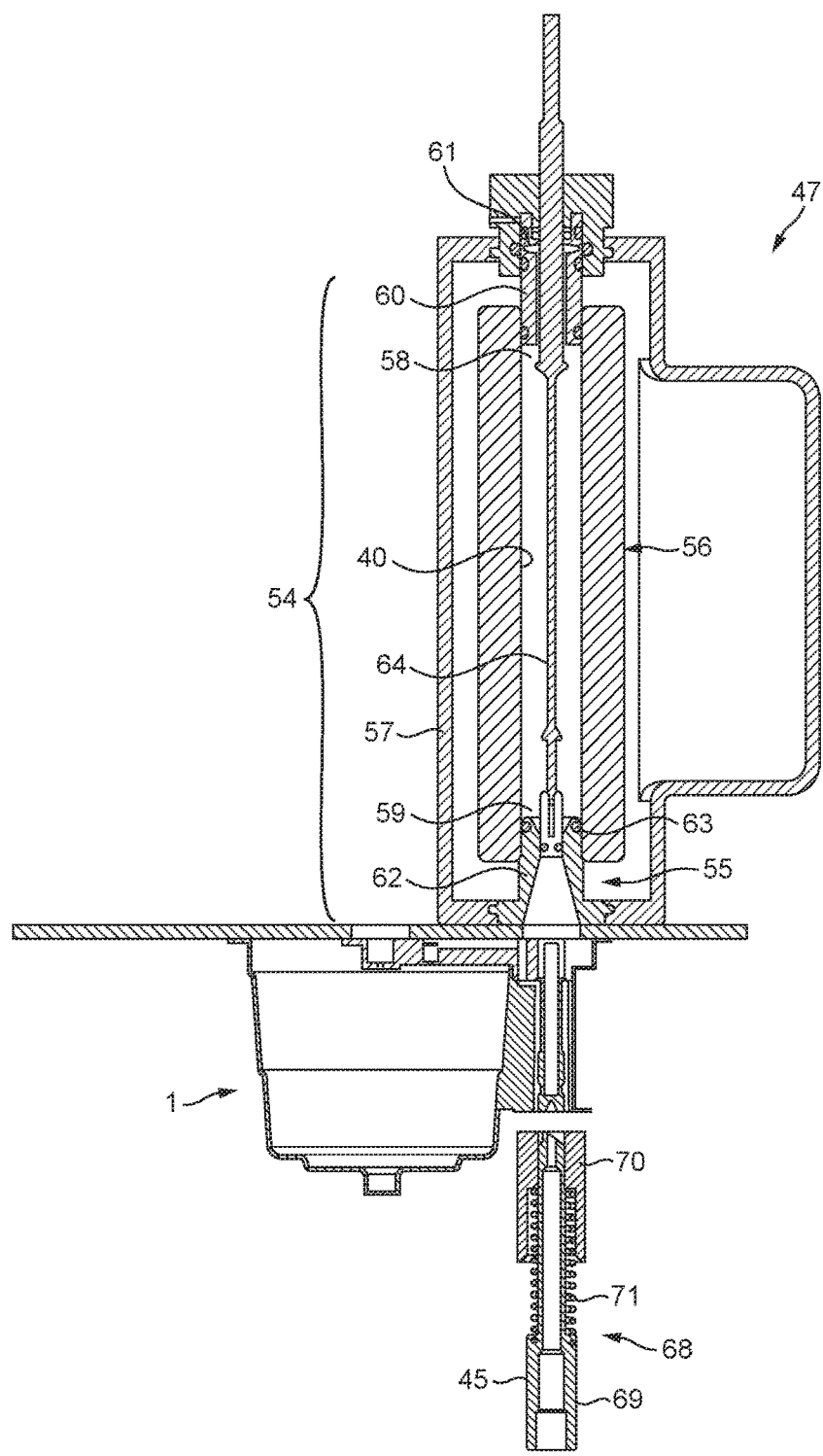
FIG. 8 represents part of the apparatus of the present disclosure in particular the liquid supply and treatment unit and the capsule connected thereto.
Figure 9:
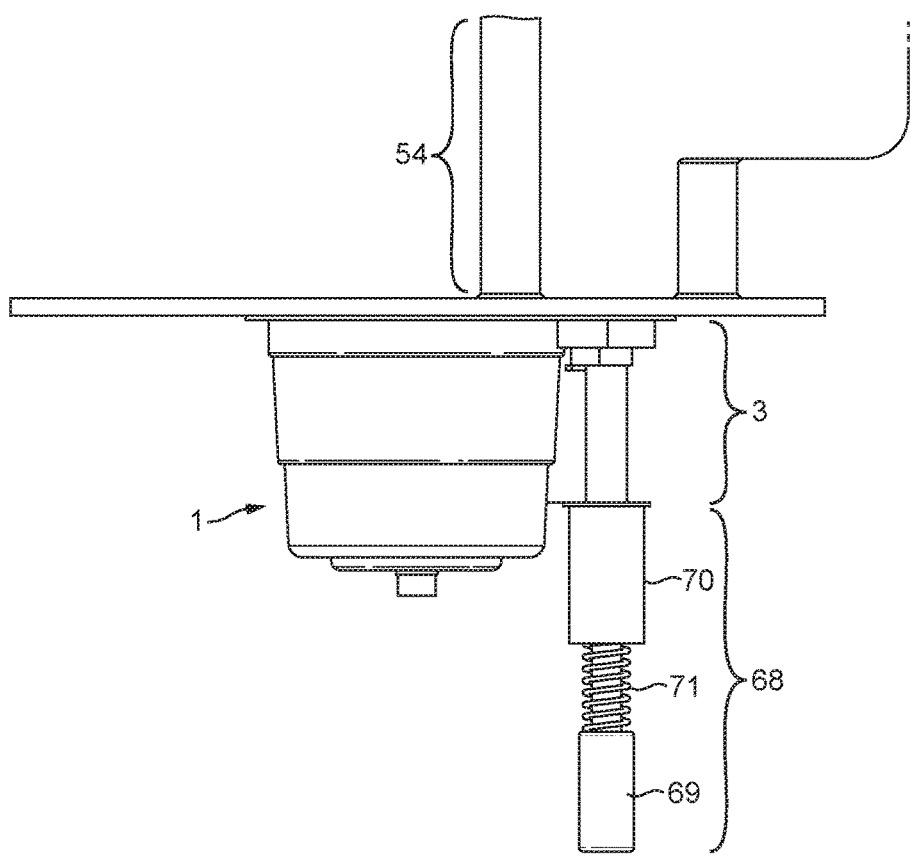
FIG. 9 is a side view of a part the apparatus of the present disclosure.

FIGS. 8 and 9 focus on the position of the capsule 1 in relation to the liquid supply and treatment unit 47 for the first and second embodiments respectively. The liquid supply treatment unit 47 generally comprises an optical irradiation chamber 54 configured for cleansing liquid passing or circulating therein and a connection assembly 55 for fluidly connecting the liquid supply and treatment unit with the capsule 1.

The optical irradiation chamber 54 generally comprises a tube 40 for guiding liquid and an irradiating member 56. In certain non-limiting embodiments, the irradiating member is at least one lamp delivering ultraviolet light (UV) towards the interior of the tube. The UV emission is controlled by the control unit to be effective for sanitizing liquid circulating in the tube. The tube is transparent to UV and may be constituted as a part separate of the irradiated member or an integrated wall thereof. On the outside, the optical irradiation chamber 54 may comprise a protective casing 57 which is opaque to the radiation.

As an example, the optical irradiation chamber can use discharge plasma technology. The UV lamp contains a gas such as xenon for the generation of an electromagnetic wave that emits UV in the range of 260 to 280 nm. This lamp provides advantages compared to standard UV lamp as it is more compact, instantaneously efficient and shows high UV efficiency and microbial inactivation rate compared to standard (mercury) UV lamp thanks to the generated pulses and spectral difference in the UV output. However, other UV irradiation technology could be used as possible alternatives such as UV LEDs.

The optical irradiation chamber 54 further comprises an inlet end 58 for liquid to enter the chamber and an outlet end 59 for liquid to exit the chamber. At the inlet end, a (inlet) bushing 60 may be provided with liquid inlet(s) 61 connected to the liquid circuit 43. On the outlet end 59 of the tube, a (outlet) bushing 62 is provided with a flow passage for direct connection of the capsule as described later. In certain non-limiting embodiments, the bushing 62 is made of a material that reflects UV radiation such as stainless steel or similar material. The bushing 62 may also advantageously serve as an electrode for measuring the conductivity of liquid and so controlling if the tube is properly filled with liquid. In certain non-limiting embodiments, the chamber 54 comprises a valve 63 which is provided to fluidly close the bushing 62. The valve can be actively controlled by the control unit for closing and opening the tube. In particular, in certain non-limiting embodiments, the bushing 62 is connected to an activation rod 64 which can advantageously be a movable ground electrode of the discharge plasma UV lamp. The rod or electrode may be connected at its rear or external part to a motor (not illustrated) that can move the valve 63 reciprocally in at least two positions; a closing position where the valve sealingly engages the bushing in closure of its flow passage and an open position where the valve is moved away (i.e. retracted) from the bushing. In FIG. 8, the bushing 62 is closed by the valve 63 and so is the irradiation chamber 54 and tube 40. In such configuration, the irradiation chamber can irradiate liquid contained in the tube or be switched off.

In FIGS. 8 and 9, the spout 3 is positioned in a predetermined reference position relative to the liquid supply and treatment unit such as by a part of the fitment engaged therein. The fluid connector remains in stored position. The valve 63 maintains the chamber closed and liquid inside the chamber can be irradiated by UV for sanitizing pre-treatment during a period of time (e.g. 3-10 seconds).

Figure 10:
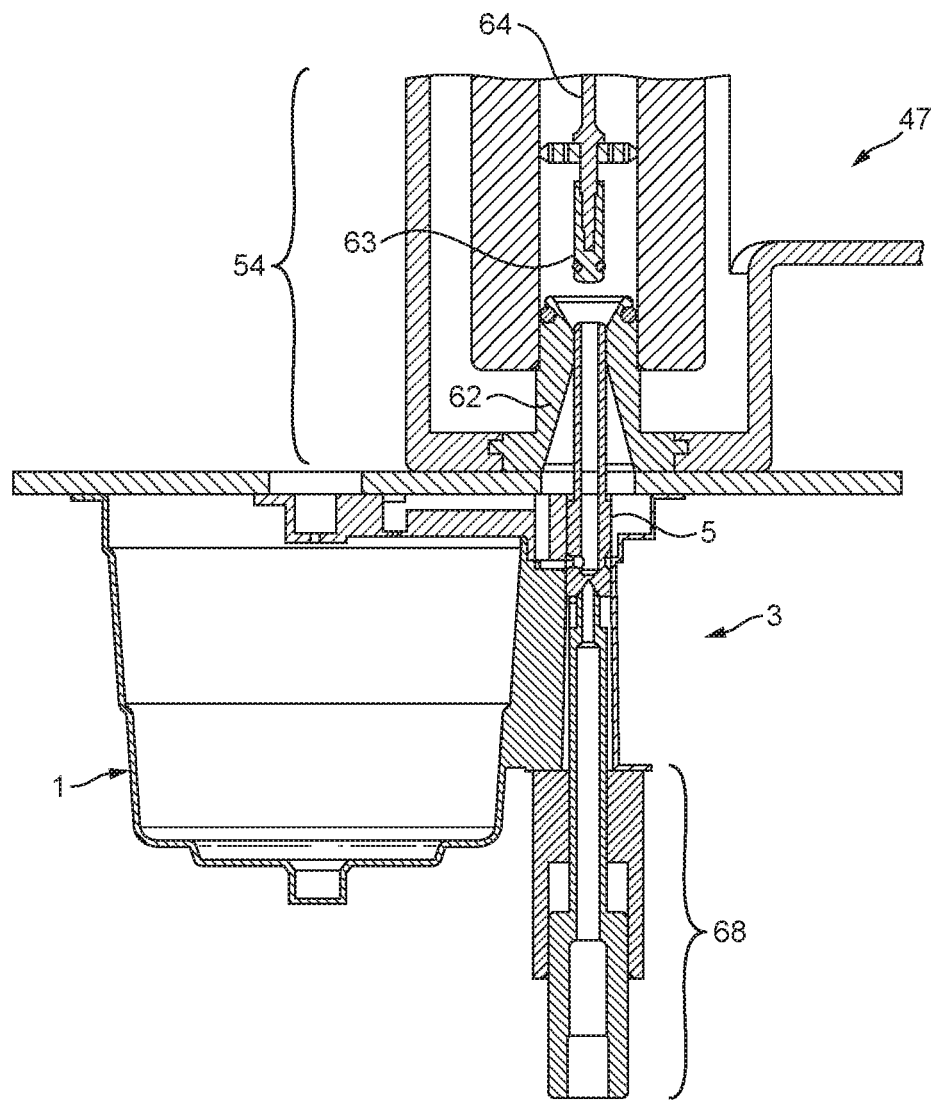
FIG. 10 represents part of the apparatus in the UV treatment position of the fluid connector.

FIGS. 10 and 11 show the capsule 1 and its spout 3 connected to the liquid supply and treatment unit 47 with the fluid connector 5 displaced into an inserted position through the bushing 62 and its tip 8, as well as the liquid inlet, being exposed to the UV irradiation field in the tube. The valve 63 is disengaged from the bushing 62 and is positioned inwardly of the tube at distance from the fluid connector. In such position of insertion, the tip of the valve 63 can be de-contaminated.

In certain non-limiting embodiments, the bushing 62 comprises at least one annular sealing surface portion 66 that is arranged to snugly fit to the sealing annular surface portion of the fluid connector for providing a liquid-tight sealing engagement of the fluid connector when inserted. The bushing further comprises a flared surface portion 67 that extends from the sealing surface portion 66 towards the inside of the optical irradiation chamber or tube 40. This flared shape of the surface portion enables to reflect and diffract the UV rays and maximize the exposure of the valve 63 and tip of the fluid connector.

Figure 13:
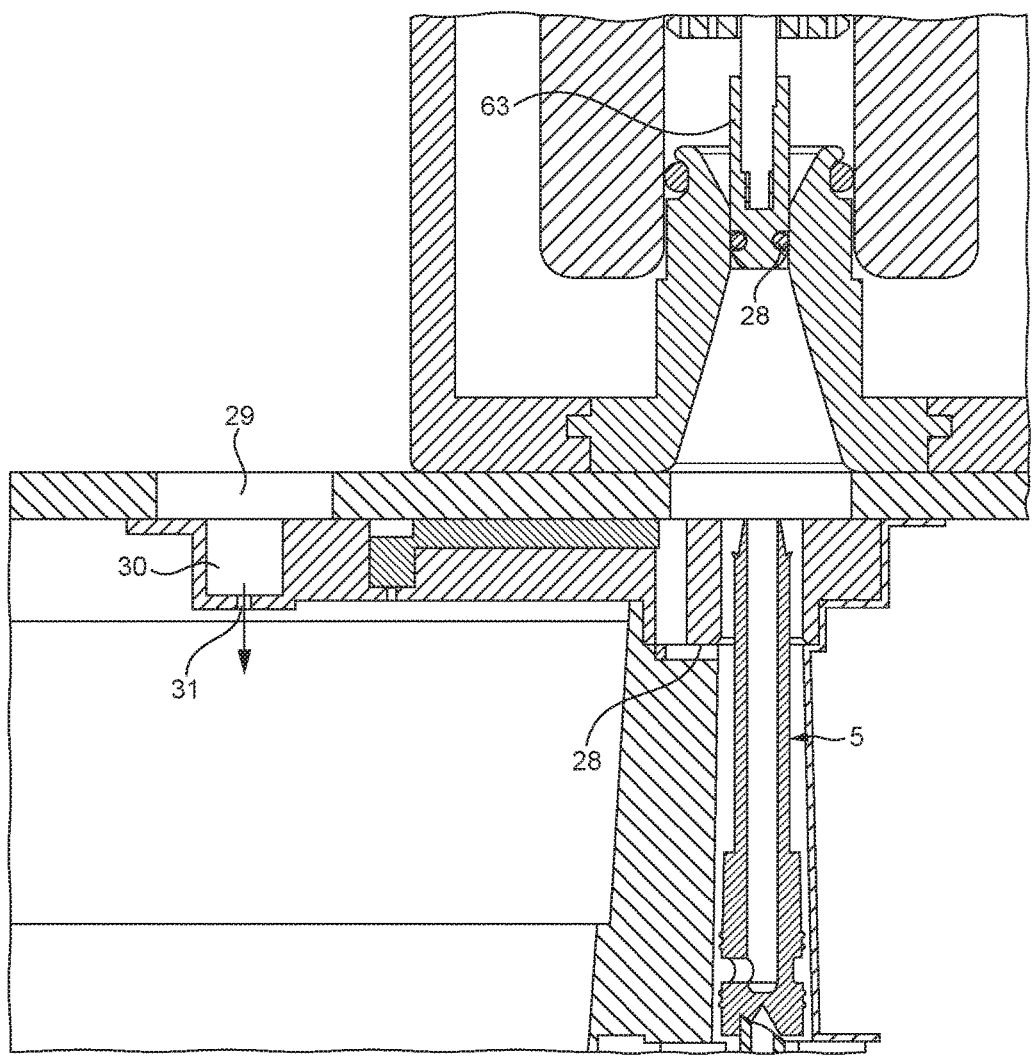
FIG. 13 represents a part of the apparatus in emptying mode by pressurized air.

For the fluid connector 5 to be moved between the storage position and extension position, the liquid supply and treatment unit 47 comprises an actuating mechanism 68 which actuation is controlled by the control unit. The actuating mechanism comprises a pusher 69 arranged in a guide 70 in reciprocal translation. A return spring 71 is mounted between the pusher and guide to return the pusher in rest position (FIG. 13). The pusher is pushed by a motor or similar actuator which is driven by the control unit (not represented).

In FIG. 12, is illustrated the liquid dispensing mode. The fluid connector 5 remains inserted through the outlet bushing 62 with, in certain non-limiting embodiments, its tip 7 being still exposed to the UV radiation emitted by the irradiation member. In certain non-limiting embodiments, the fluid connector is in the same position relative to the housing 6 as in the treatment position of FIGS. 10 and 11. The fluid connector comprises a frontal portion 9 of needle that actually defines a length of the fluid connector extending telescopically beyond the housing. The abutment 19 can be provided to determine the position of the fluid connector in extension.

When the fluid connector 5 is in the liquid dispensing position, the liquid outlet 17 matches with the liquid inlet 28 of the housing and/or guiding insert. Such liquid inlet communicates with the product compartment as described earlier for supplying sanitized liquid in the container 3. Liquid generally fills the capsule and mix with the nutritional ingredients to form the beverage. Pressure may build inside the capsule and beverage releases from the bottom of the capsule, e.g., through a dedicated beverage duct.

FIG. 13 illustrates the next operation of emptying the capsule by injecting pressurized air from the fluid circuit 48 (FIG. 7) inside the compartment through the air system 29, 30, 31 embedded in the capsule as described earlier. In this case, the fluid connector is retracted by the actuation mechanism in the storage position and the valve 63 of the irradiation chamber may remain closed. As a result, the liquid inlet 28 is closed and air cannot flow back to the fluid connector. The injection of pressurized air can be controlled for a predetermined period of time (e.g. a few seconds) by the control unit that corresponds to the full emptying of liquid from the capsule. Air escapes with the residual liquid through the bottom of the capsule. In this phase, the UV irradiation can be stopped by the control unit or, alternatively, still be run for a few seconds to further sanitized liquid remaining in the tube. In the next step, the capsule can be removed from the machine.

Figure 14:
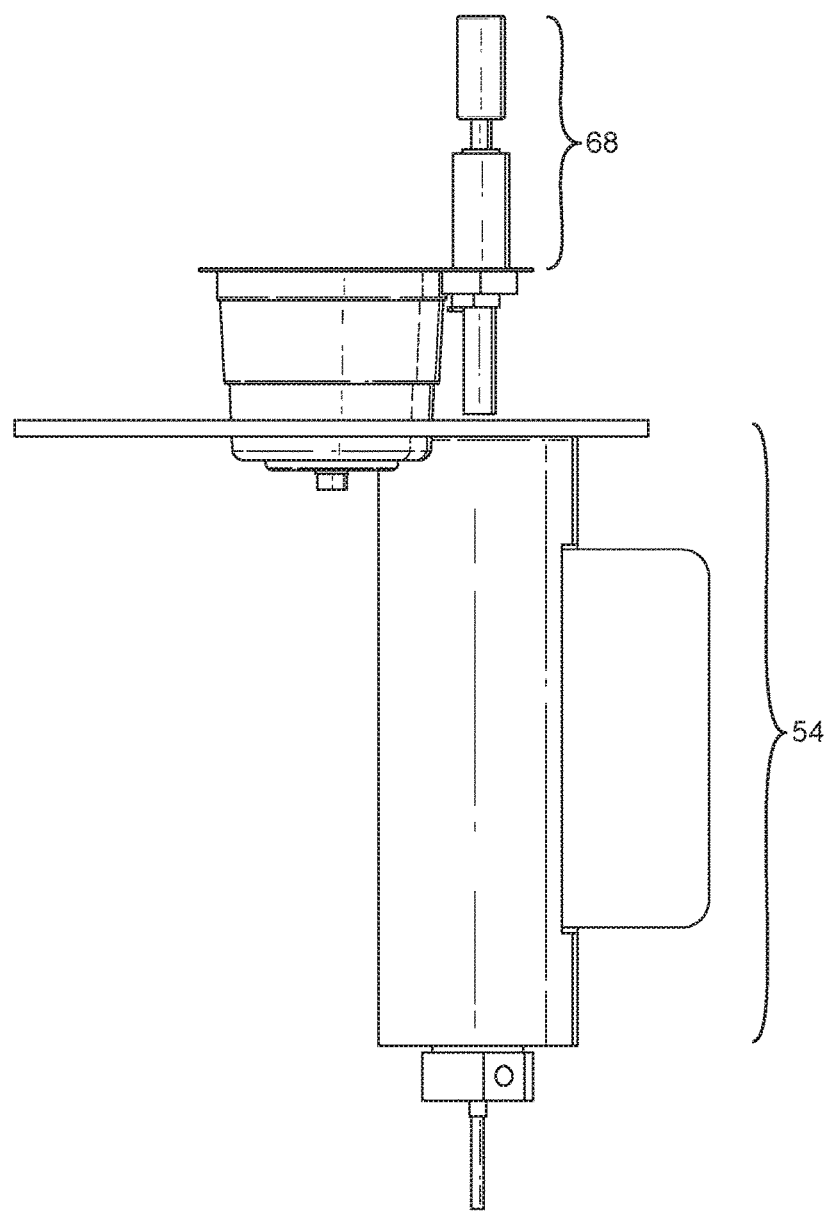
FIG. 14 represents a part of the apparatus according to a variant of FIG. 8 in particular with the liquid supply and treatment unit placed on the opposite (bottom) side of the capsule connected thereto.
Figure 15:
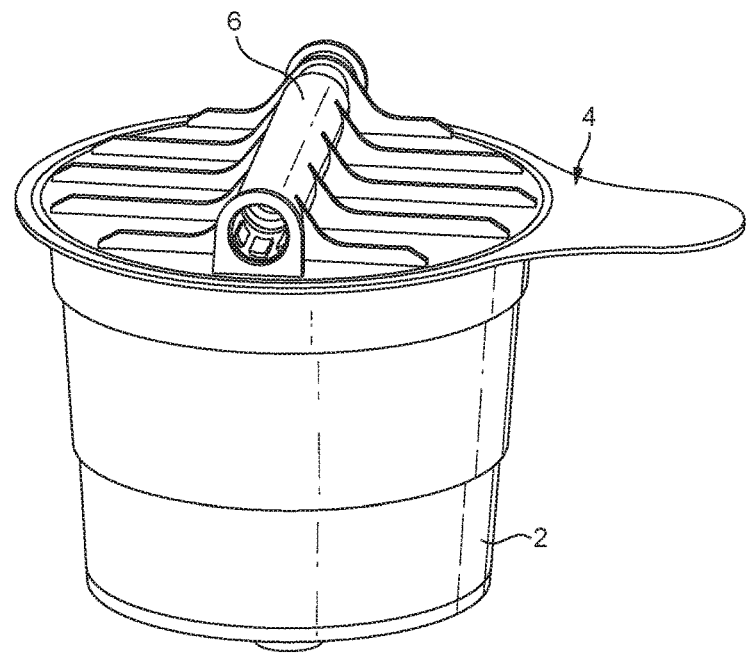
FIG. 15 is perspective view of the capsule of the present disclosure according to a second embodiment (spout integrated to the lid of the capsule).

FIG. 14 illustrates a mode in which the arrangement of the irradiation chamber 54 is below the capsule and the actuation mechanism 68 is placed on the lid side or above. In such case, the fluid connector is placed upside down in the housing. This also imposes a modified arrangement of the liquid flow path to guide cleansed liquid to the product compartment. These modifications are within the normal knowledge of the skilled person and do not need to be further detailed.

Figure 16:
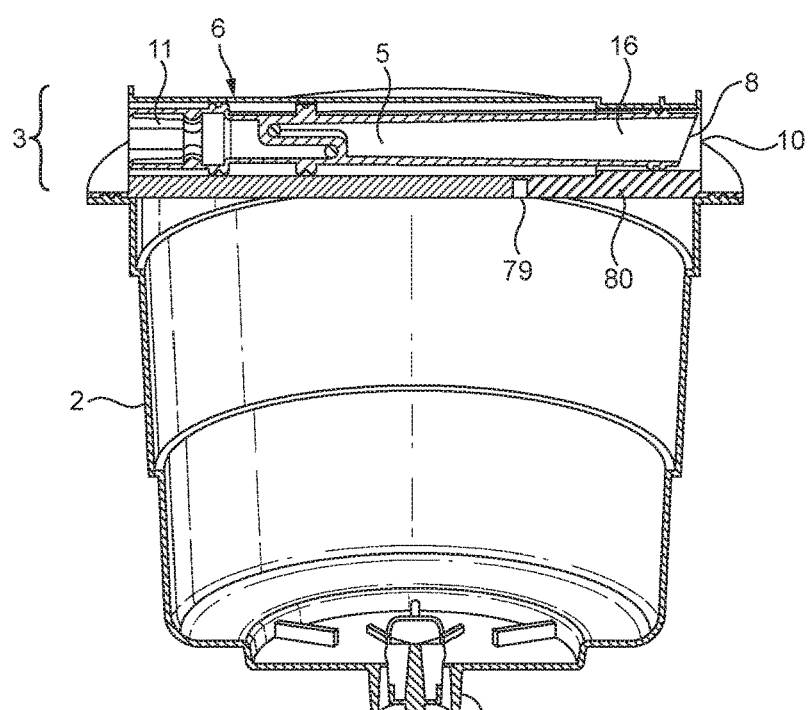
FIG. 16 perspective cross sectional view of the capsule of the present disclosure according to FIG. 15.

A second embodiment of the capsule of the present disclosure is described in relation to FIGS. 15 to 19. To avoid useless repetitions, the same numerical references are used to designate the same technical means as the ones of the first embodiment. In this embodiment, the spout 3 and housing 6 for the fluid connector 5 forms an integral part or merges with the lid 4 of the capsule that closes the compartment 2 for the ingredients. In order to provide liquid or optionally air communication from the spout to the inside of the compartment, a liquid or fluid conduit 79 is present between the housing 6 and the lid 4 (or a separation part 80 of it). FIG. 16 further represents a lower beverage duct 81 for discharge of beverage.

Figure 17:
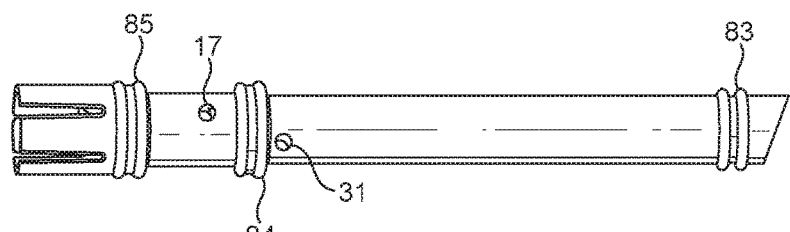
FIG. 17 is side view of the fluid connector of the capsule of FIGS. 15 and 16.
Figure 18:
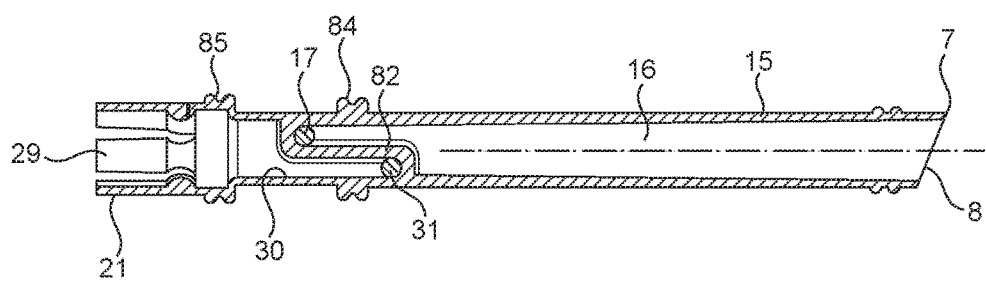
FIG. 18 is a cross-section view in longitudinal direction of the fluid connector of FIG. 15.
Figure 19:
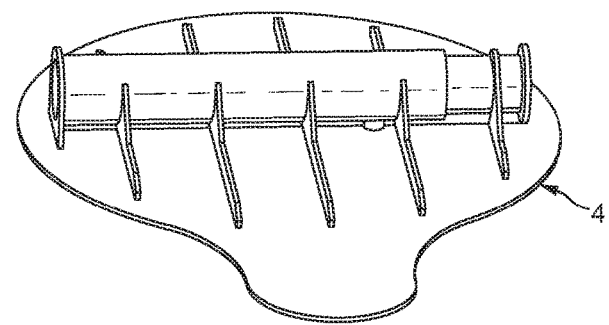
FIG. 19 represents the lid of the capsule of FIG. 15 with its integrated spout.

FIGS. 17 and 18 illustrate a fluid connector for the capsule according to the second embodiment. A particularity of the fluid connector is that it embeds both the liquid flow path, i.e., the liquid inlet 8, longitudinal liquid conduit 16, liquid transversal liquid outlet 17 and the air flow path, i.e., the air inlet 29, air conduit 30 and air outlet 31. The liquid conduit extends axially along the portion of needle 15 of the connector. The air conduit also extends axially and the air inlet is positioned at the distal end 21 of the fluid connector. A separation wall 82 is provided that extends transversally between the two air and liquid conduits 16, 30. A first annular sealing member 83 is provided at the tip 7 for engaging the sealing surface portion 66 of the bushing 62 of the irradiation chamber in a liquid tight manner. A second and third annular sealing members 84, 85 are provided on the surface to ensure the fluid tightness between the liquid outlet and air outlet and the housing.

The liquid outlet 17 and air outlet 31 are arranged angularly and longitudinally distant one another to match sequentially with the fluid conduit 79 of the lid communicating with the compartment. The fluid connector is arranged slidably and rotatably in the housing to enable the liquid outlet 17 or the air outlet 31 to match with the fluid conduit.

Figure 20:
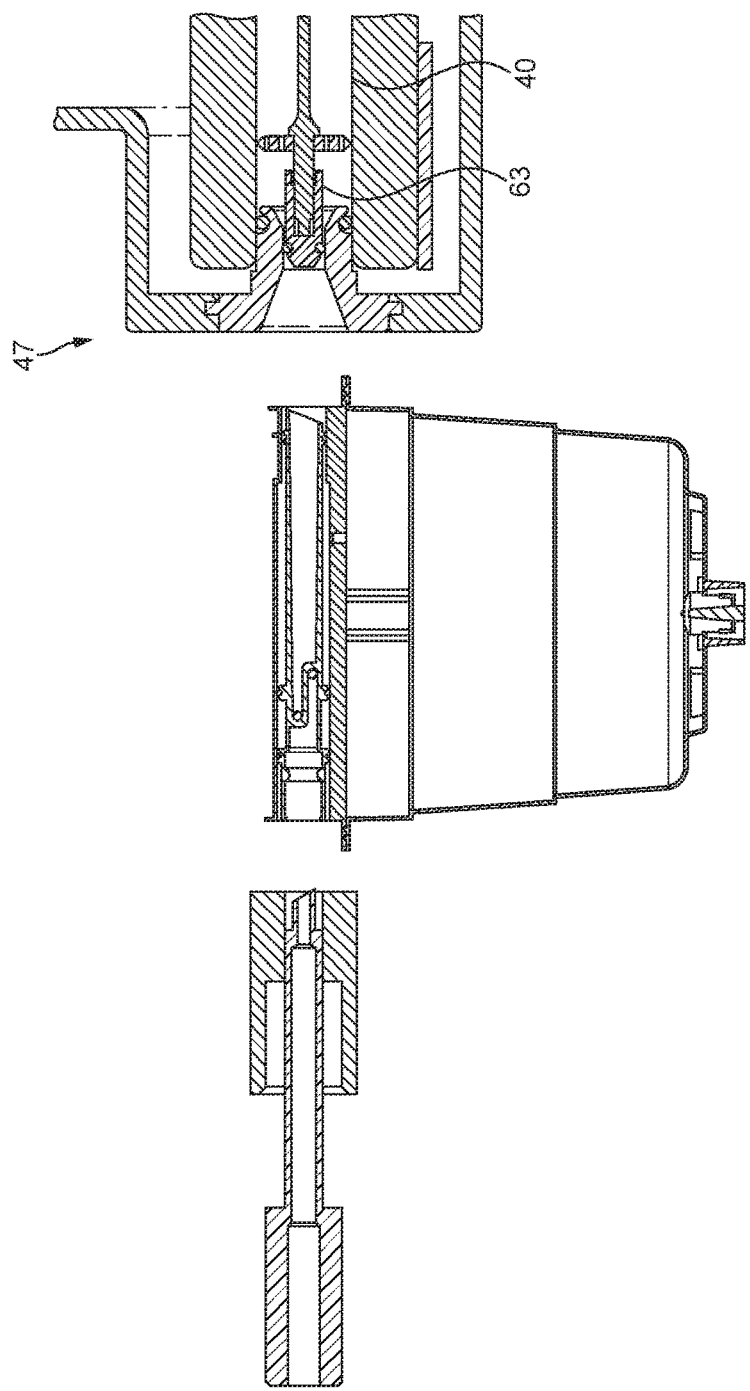
FIG. 20 represents part of the apparatus before insertion of the capsule of FIG. 15 to the liquid supply and treatment unit of the machine.
Figure 21:
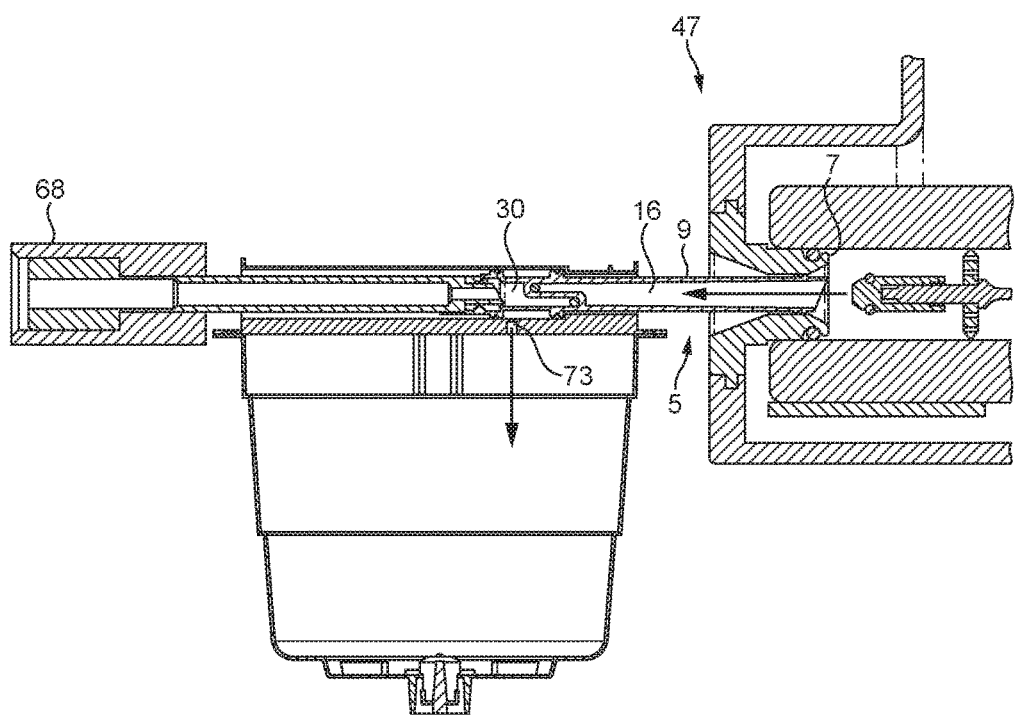
FIG. 21 represents part of the apparatus of FIG. 20 in the liquid dispensing mode.

More particularly, at the storage position of the fluid connector (FIG. 16), the fluid connector 5 is encased in the housing. Generally, the front opening of the housing and the rear opening of the housing are closed such as by breakable, tearable or removable membranes. This position also corresponds to the position of positioning of the capsule in the machine illustrated in FIG. 20. In such position, the irradiation chamber of the liquid and supply unit 47 is also closed by the valve and the chamber can be irradiated by UV for treating liquid contained inside the tube 40.

In the position of insertion of the fluid connector 5 in the liquid and supply unit 47, the actuating mechanism 68 pushes the fluid connector inside the housing and the frontal portion of needle extends beyond the housing so that at least its tip 7 becomes inserted inside the irradiation shield of the irradiation chamber, i.e., within the tube. In certain non-limiting embodiments, the UV irradiation of the chamber is started a few seconds before the valve is opened. When the tip 7 is inserted, the valve 63 is opened. The tip of the valve 63 can be irradiated during a predetermined period of time (e.g. 2-10 seconds) to sanitize it. Then the pump is activated while the irradiation chamber maintains the UV irradiation running to ensure that all the liquid which is supplied by the liquid pump of the machine and passed through the fluid connector is sanitized. The UV irradiation is maintained for all the time liquid is circulated through the chamber and fed to the capsule (e.g., beverage preparation process).

In this relative position of the fluid connector, the liquid conduit 16 of the fluid connector is in fluid communication with the fluid conduit 79 of the lid. The air conduit is closed. This can be possible by the set of sealing members 84, 85 acting against the inner surface of the housing and positioned on each part of the separation wall and the opposite arrangement of the outlets 17, 31 relative to the sealing member 84. An air gap is formed between the second and third sealing members 54, 58 the fluid connector and the inner surface of the housing. This liquid gap communicates both with liquid outlet 17 of the fluid connector and the liquid conduit of the lid. Sanitized liquid can thereby be supplied from the liquid supply and treatment unit to the product compartment of the capsule.

Figure 22:
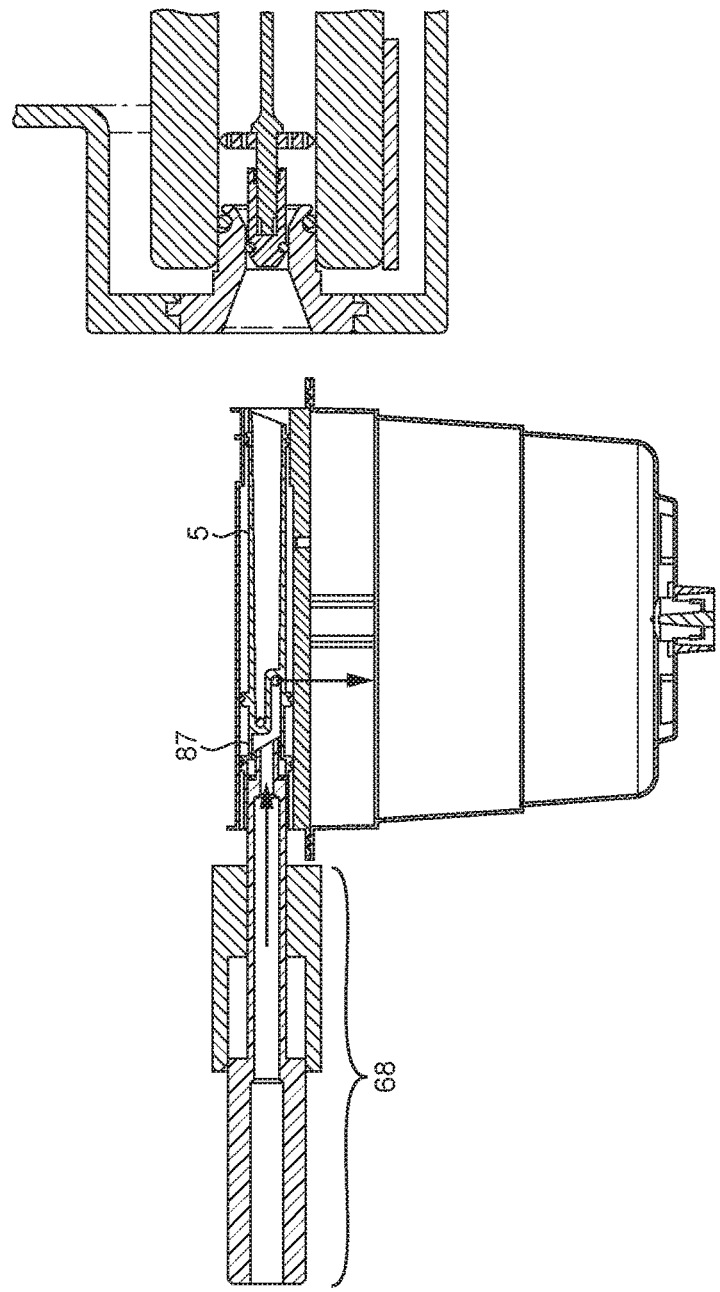
FIG. 22 represents part of the apparatus of FIG. 20 in the emptying mode with pressurized air.

In the mode of FIG. 22, the fluid connector is returned to its storage position by the actuating mechanism 68. In this position, the air outlet 31 communicates with an air gap which is formed between the first and second sealing members 83, 84, the surface of the fluid connector and the outer surface of the housing. Air can be fed through an air conduit 86 provided along the pusher 69 which terminates by an air outlet connected in an airtight manner to the air inlet of the hollow distal end 21 of the fluid connector. Air can so be pressurized inside the product compartment to push residual liquid and beverage out of the capsule such as through its bottom beverage duct.

Possibly, the fluid connector comprises a filtering means to filter liquid (not illustrated). The filter may be a filter for filtering contaminants and/or solid particles contained in liquid.

In the present description, the fluid connector is described as displaceable relative to the housing. It must be kept in mind that it covers the variants of spout where the fluid connector is stationary relative to the compartment of the capsule and the housing is displaceable (e.g. telescopically retractable).

Although the present disclosure has been described by way of example, it should be appreciated that variations and modifications may be made without departing from the scope of the present disclosure as defined in the claims. Furthermore, where known equivalents exist to specific features, such equivalents are incorporated as if specifically referred in this specification.

The invention claimed is:

1. A capsule, for preparing a beverage, connectable to a machine for supplying sanitized liquid to the capsule, wherein the capsule comprises:
   a product compartment containing nutritional ingredients to produce the beverage when associated with a liquid;
   a spout comprising a housing exterior to the product compartment and containing a fluid connector adapted to be fluidly connected to a connection part of a liquid supply and treatment unit of a machine and to supply liquid inside the product compartment;
   wherein the fluid connector is arranged in the housing to be displaceable between a storage position in which the fluid connector is enclosed within the housing or in an extended position in which at least a frontal portion of the fluid connector includes a tip with a liquid inlet extends beyond the housing.

2. The capsule according to claim 1, wherein the fluid connector is sealingly arranged inside the housing in aseptically stored condition.

3. The capsule according to claim 1, wherein the fluid connector is arranged in the housing to be slidably moveable between the storage position and the extended position.

4. The capsule according to claim 3, wherein the housing is configured at least partially as a guiding tube for housing the fluid connector, with a front end opening for enabling the frontal portion of the fluid connector to extend beyond the housing in the extended position and a rear end opening forming a passage to a pusher (69) of the machine for enabling the pusher to push a distal end (21) of the fluid connector so that the fluid connector can be moved into the extended position.

5. The capsule according to claim 4, wherein the front end opening and/or rear end opening is sealed by a breakable, tearable or removable sealing part.

6. The capsule according to claim 5, wherein the sealing part is a membrane.

7. The capsule according to claim 1, wherein the fluid connector comprises a portion of a needle comprising a longitudinal internal liquid conduit extending axially along the portion of the needle from the liquid inlet at the tip to at least one liquid outlet positioned or extending transversally to the axial conduit.

8. The capsule according to claim 7, wherein the frontal portion of the fluid connector including the tip extends beyond the housing when in the extended position a length of at least 5 mm.

9. The capsule according to claim 8, wherein the frontal portion of the fluid connector is extendable beyond the housing in extended position of a length of between 8 and 20 mm.

10. The capsule according to claim 7, wherein the liquid outlet is positioned to match with a liquid inlet and/or liquid conduit in the housing communicating with the product compartment when the fluid connector is moved towards or into the extended position respectively.

11. The capsule according to claim 7, wherein the product compartment comprises a large opening and the housing comprises a small opening and a seat, the product compartment and the housing together form an integral moulded body, the seat further comprising a guiding insert fluidly connecting the fluid connector to the product compartment.

12. The capsule according to claim 11, wherein the guiding insert comprises a liquid inlet arranged for matching or communicating with the liquid outlet of the fluid connector in a liquid dispensing position of the fluid connector in the housing, a liquid conduit and at least one liquid outlet communicating with the product compartment.

13. The capsule according to claim 12, wherein the liquid dispensing position corresponds to the extended position.

14. The capsule according to claim 12, wherein the guiding insert comprises an air inlet, air conduit and air outlet which are separated from the liquid inlet, liquid conduit and liquid outlet.

15. The capsule according to claim 14, wherein the air inlet is closed by a lid.

16. The capsule according to claim 11, wherein the large opening is closed by a lid attached onto a flange bordering the product compartment and the seat.

17. The capsule according to claim 16, wherein the fluid connector is also arranged adjacent the lid to break or perforate the lid when moved to the dispensing or extended position.

18. The capsule according to claim 7, wherein the housing for the fluid connector forms an integral part of or merges with a lid closed onto the product compartment; and wherein a fluid conduit is present between the housing and the lid which is arranged for fluid to be transferred from the fluid connector to the product compartment.

19. The capsule according to claim 18, wherein the fluid connector further comprises a longitudinal internal air conduit extending axially along the fluid connector from an air inlet at the distal end of the fluid connector to an air outlet positioned or extending transversally to the axial air conduit; a separation wall being present between the air and liquid conduits; and sealing means being further provided between the fluid connector and the housing to allow the fluid connector to be sealingly positioned in a liquid dispensing position where the liquid outlet communicates with the fluid conduit of the housing and in an air dispensing position where the air outlet of the fluid connector communicates with the fluid conduit of the housing; the two positions being dependent on the fluid connector longitudinal position relative to the housing.

* * * * *